United States Patent
Nijboer et al.

(10) Patent No.: US 8,127,662 B2
(45) Date of Patent: Mar. 6, 2012

(54) APPARATUS FOR PREPARING A BEVERAGE FROM STERILIZED WATER OF A PREDETERMINED CONSUMPTION TEMPERATURE

(75) Inventors: Marie Sybien Nijboer, Drachten (NL); Klaas Kooijker, Drachten (NL); Anke Sinnema, Drachten (NL); Peter Sofrides Viet, Drachten (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 625 days.

(21) Appl. No.: 12/300,812

(22) PCT Filed: May 14, 2007

(86) PCT No.: PCT/IB2007/051805
§ 371 (c)(1),
(2), (4) Date: Nov. 14, 2008

(87) PCT Pub. No.: WO2007/135611
PCT Pub. Date: Nov. 29, 2007

(65) Prior Publication Data
US 2009/0183637 A1 Jul. 23, 2009

(30) Foreign Application Priority Data
May 19, 2006 (EP) .................................... 06114265

(51) Int. Cl.
*A47J 31/00* (2006.01)
(52) U.S. Cl. .............. 99/275; 99/280; 99/300; 99/323.3
(58) Field of Classification Search .................... 99/280, 99/281, 300, 304, 306, 307, 275, 323.3; 222/146.1
See application file for complete search history.

(56) References Cited

U.S. PATENT DOCUMENTS

| | | | | |
|---|---|---|---|---|
| 3,352,460 A * | 11/1967 | Herring | ....................... | 222/129.4 |
| 4,792,059 A * | 12/1988 | Kerner et al. | .................... | 222/67 |
| 5,570,816 A * | 11/1996 | LaBarbera, Jr. | ........... | 222/129.4 |
| 5,975,365 A * | 11/1999 | Hsieh | ........................... | 222/129.4 |
| 6,240,829 B1 * | 6/2001 | McGarrah | ........................ | 99/275 |
| 6,460,735 B1 * | 10/2002 | Greenwald et al. | ........ | 222/146.1 |
| 2005/0150393 A1 | 7/2005 | Biderman et al. | | |
| 2005/0230343 A1 | 10/2005 | Huber | | |

FOREIGN PATENT DOCUMENTS

| | | |
|---|---|---|
| DE | 8813913 U1 | 5/1989 |
| DE | 29611088 U1 | 3/1997 |
| EP | 1159907 B1 | 12/2001 |
| WO | 9318695 A1 | 9/1993 |
| WO | 0158328 A1 | 8/2001 |
| WO | 2005067385 A2 | 7/2005 |
| WO | 2005120313 A1 | 12/2005 |

* cited by examiner

*Primary Examiner* — Reginald L Alexander
(74) *Attorney, Agent, or Firm* — Sherry Austin

(57) ABSTRACT

The invention relates to an apparatus for preparing a beverage, for instance baby milk, from an instant product, such as formula, and water, which has been sterilized and cooled down to a temperature suitable for consumption. The apparatus comprises a water supply system for supplying water, a heating system for sterilizing the water, a cooling system for cooling down the sterilized water and a bypass, which allows sterilized water from the heating system to bypass the cooling system. Thanks to such configuration, hot water from the bypass can be added to cool water from the cooling system so as to bring the temperature of the cool water to a desired consumption temperature.

11 Claims, 4 Drawing Sheets

APPARATUS FOR PREPARING A BEVERAGE FROM STERILIZED WATER OF A PREDETERMINED CONSUMPTION TEMPERATURE

The invention relates to an apparatus for preparing a beverage from an instant product and water, which water beforehand has been sterilized and cooled down to a desired consumption temperature.

Apparatuses of this type are known, for instance for preparing baby milk from formula. When used for this purpose, it is of paramount importance that the temperature of the sterilized water can be quickly, accurately and reliably cooled down to a desired drinking temperature.

From DE 88 13913 U an apparatus is known for preparing baby milk, in which water to be used is passed along a heating system and a cooling system, to provide sterile water of a desired consumption temperature. An advantage of this known apparatus is that the water is supplied and sterilized just before use and therefore guaranteed fresh and microbiologically safe. A disadvantage, however, is that the heating and cooling process may take a long time, resulting in long waiting times. Furthermore, it is unlikely that the desired consumption temperature can be accurately and reliably attained, now that said temperature depends on many process parameters, such as the characteristics of the cooling system, the heating temperature of the heating system, the flow rate, etc.

The above disadvantages are more or less overcome in US 2005/0150393, featuring a baby milk apparatus, which is capable of quickly delivering a quantity of sterile water at accurately controlled consumption temperatures. To that end the apparatus comprises at least two water reservoirs, each equipped with a heater, a thermal sensor and a controllable water outlet. The heaters are operated periodically and alternately to boil and sterilize the water, so that at any given time, one of the reservoirs contains water that is warmer than the consumption temperature and the other reservoir contains water that is colder than said consumption temperature. Consequently, it is possible, at any given time, to generate water of the desired consumption temperature by mixing appropriate quantities of water from said reservoirs. A disadvantage of this known apparatus is that the arrangement is voluminous and expensive, because of the redundancy in components (heaters, reservoirs, thermal sensors, etc.). Moreover, the periodic heating and cooling of the water may deteriorate the water quality, and is energy consuming.

It is therefore an objective of the invention to provide an apparatus of the above-described type, in which the disadvantages of the known apparatuses have been overcome, or at least partly reduced. More particularly, it is an objective of the invention, to provide an apparatus for preparing a beverage from an instant product and sterilized water, which features short preparation times and accurate and reliable temperature control of discharged beverage.

To that end an apparatus according to the invention is characterized by the features of claim 1. By providing the apparatus with a bypass, which branches off somewhere between the outlets of the heating system and the cooling system, it is possible to produce water of any desired temperature, simply by mixing the cooled down water from the cooling system with an appropriate amount of warm water from the bypass. Such mixing can be done quickly, accurately and reliably, with a minimum of additional components. Moreover, the cooled down water and the warm water are both sterile, and their sterilization has taken place just before use. Thus the final mixture will be guaranteed fresh and microbiologically safe.

According to one aspect of the invention, the warm and cold water leaving the bypass and cooling system respectively can be mixed in a desired ratio by use of a valve. This valve may be arranged in the bypass or in a line leaving the cooling system or in both. In the latter case, a three-way valve may be used. The or each valve may be simple valves which can be either completely opened or completely closed, in which case flow rate control may be performed by varying the duration during which and/or the frequency with which the valves are opened and closed. Alternatively, the or each valve may be of a type that allows a passage opening to be controlled, thereby allowing a flow rate through the valve to be controlled by adjusting said passage opening. If the valves are located properly, no separate mixing chamber is needed, nor additional pumping means. This may help to maintain the apparatus simple and compact.

According to another aspect of the invention, the cooling and heating system can be interconnected in such way that water from the supply system can successively pass through the cooling system where it can serve as cooling fluid, the heating system where it can be sterilized, and the cooling system once more, where it can be cooled down. Such arrangement is very energy efficient, because part of the energy that is input into the water in the heating system, is recovered in the cooling system and subsequently re-used to preheat the water that is fed to the heating system. Furthermore, such arrangement allows the number of pumping means to be minimized, as no separate pumping means are needed for pumping around cooling fluid. If used in combination with a suitable valve, for instance the aforementioned three-way valve, the apparatus can suffice with only a single pumping means for passing the water through the heating system and the cooling system and for mixing water from the cooling system and the bypass to a desired temperature.

According to yet another aspect of the invention, the sterile water from the bypass may advantageously be used for rinsing parts of the apparatus, especially parts that during use may contact the prepared beverage, such as a mixing chamber, mixing means and/or a dispense outlet of the apparatus. Where the beverage is baby milk, the water from the bypass may also be used for rinsing a bottle and/or a teat. It will be clear that in such case, it may be preferred to have the bypass branch of in or near the heating system, where the water is still very hot.

According to an advantageous aspect of the invention, the apparatus can be programmed to carry out such rinsing action before and/or after each beverage preparation session. For instance, when water and instant product are mixed, a small amount of water may be kept back initially, to only be released at the end of the session. This water can then rinse away any mixture that may remain in the apparatus. In a similar way, a small amount of water may be released at the beginning of each session, before the other ingredients, so as to cover relevant parts of the apparatus with a thin film of water, which may help to prevent the prepared mixture from adhering to said parts.

According to another advantageous aspect of the invention, the apparatus may be provided with a steam generator, for producing superheated steam. With such superheated steam a bottle and/or a teat may be sterilized quick and energy efficient. This in contrast to conventional methods, which make use of boiling water or a microwave. These conventional methods are time and energy consuming, because with the first method, a considerable amount of water has to be brought to boil and with the second method, the bottle has to be placed in a plastic container, which has to be filled with a considerable amount of water as well, so as to ensure that the container will be entirely filled with steam.

The super heated steam can for instance be produced by a thermoblock, which may make use of sterile water, tapped from the heating or cooling system of the present apparatus.

According to a preferred embodiment, the steam generator may furthermore include an interface, designed to hold and seal off a container. The interface is provided with an inlet opening for filling the container with steam, and an outlet opening for allowing condensed water to exit the container. The container can be filled with superheated steam, and small items placed in said container, such as a teat, may be sterilized. Preferably, the design of the interface is such that the container can be replaced by a baby bottle, so that the inside of this bottle can be sterilized, by filling it with steam.

According to other aspects of the invention, the cooling system may comprise a counter flow heat exchanger and/or the heating system may be arranged to sterilize the water by heating said water to temperatures below 100° C. Both aspects help to minimize the time needed for heating and subsequently cooling down the water, resulting in short preparation times.

Further advantageous aspects and embodiments of an apparatus according to the present invention are set forth in the dependent claims.

To explain the invention, exemplary embodiments thereof will hereinafter be described with reference to the accompanying drawings, wherein:

FIG. 1 schematically shows a first set-up of an apparatus according to the invention;

Below, the invention will be explained in relation to an apparatus for preparing baby milk from formula. However, the invention is not limited to such application. On the contrary, it may be embodied in any apparatus, that uses sterile water of a predetermined consumption temperature, for instance an apparatus that prepares beverages for consumers with little resistance, such as babies, elderly people or sick people, an apparatus that prepares health related beverages, such as medical drinks or health enhancing drinks, or an apparatus that is intended for use in regions with poor tap water quality.

In this description, the term 'sterile' refers to 'commercially sterile' as opposed to 'clinically sterile'. Water that is commercially sterile may still contain bacteria, but the harmful ones have been destroyed or inactivated. For most commercial applications, the present application included, commercially sterile suffices.

Figure 1:
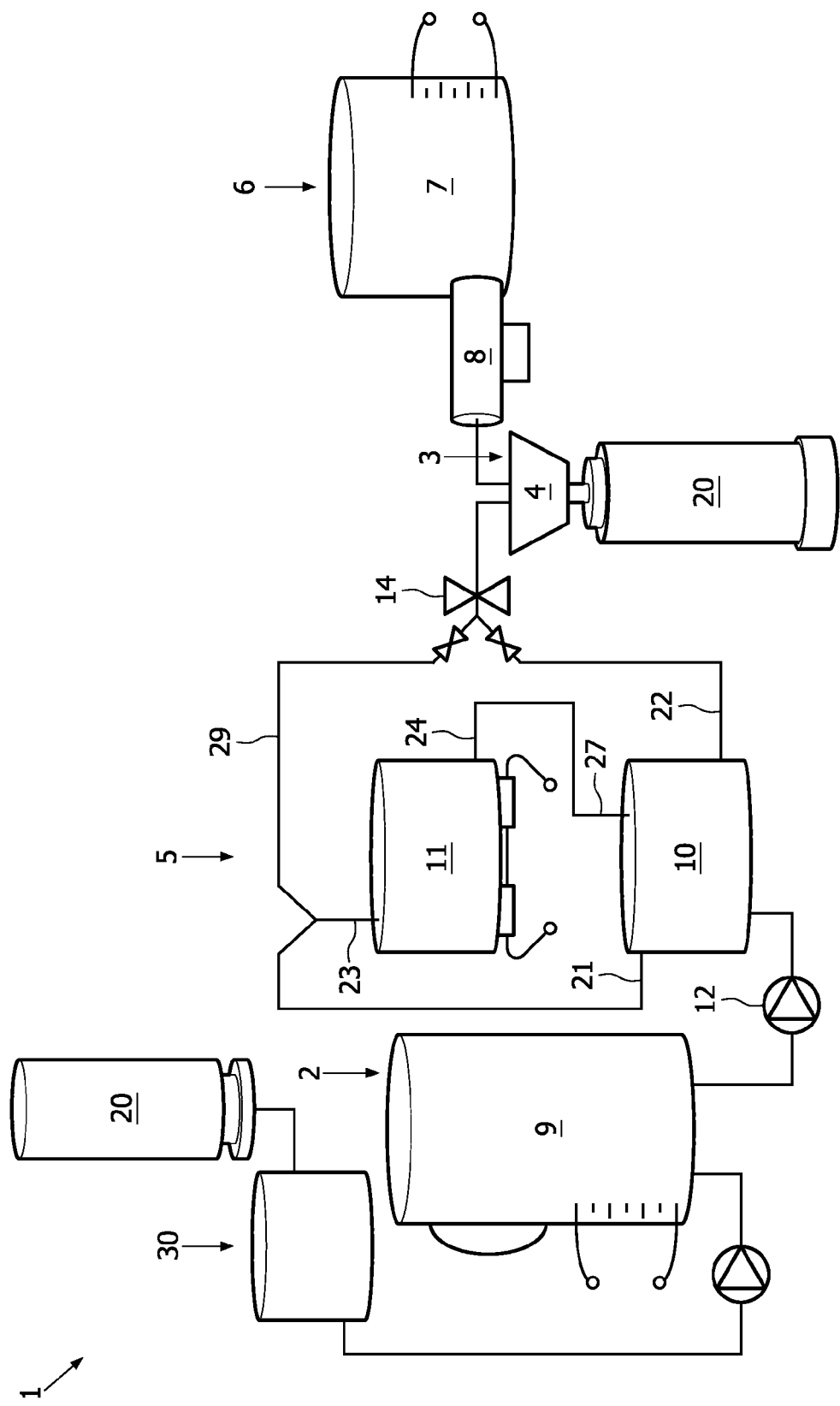

The apparatus 1 shown in FIG. 1 comprises a water supply system 2 and a formula supply system 6, arranged to feed predetermined amounts of water and formula to a mixing unit 3, in which the aforementioned ingredients are mixed so as to form baby milk.

The water supply system 2 may comprise a water reservoir 9, as shown, or alternatively may be directly connectable to a tap water mains. The water supply system 2 furthermore includes pumping means 12 and suitable supply lines, which can be arranged in many ways. FIG. 1 is therefore not to be construed as limiting.

The formula supply system 6 may comprise a container 7 and a suitable discharge arrangement 8, for dispensing the desired amount of formula from the container 7 to the mixing unit 3. The supply system 6 may for instance be configured as described in the non pre-published patent application of applicant, entitled "Apparatus for preparing baby milk from instant formula", the contents of which are incorporated herein by reference.

The mixing unit 3 may comprise a mixing chamber 4 with suitable mixing means (not shown) for mixing the water and formula to a smooth, lump free mixture. Alternatively, mixing may be done outside the apparatus 1. Suitable mixing arrangements are for instance described in the non pre-published patent application of applicant, entitled "Apparatus for preparing a beverage from an aqueous liquid and a fatty instant product, in particular baby milk", the contents of which are incorporated herein by reference The apparatus 1 illustrated in FIG. 1 furthermore comprises a water treatment section 5, including a heating system 11 for sterilizing the water, and temperature control means for lowering the temperature of the sterilized water to a desired temperature, suitable for consumption. For babies, such suitable consumption temperature may for instance range from room temperature to about 45° Celsius, with a preference for about 37° Celsius.

The heating device 11 may for instance comprise a boiler, an electric coil, or any other suitable heating means. In this heating system 11, the water can be made sterile through boiling. Alternatively, the water can be made sterile by heating the water at a sterilization temperature Ts below 100° Celsius during a sufficient amount of heating time t, wherein the heating time t needs to be longer as the heating or sterilization temperature Ts is lower, and wherein the minimum required sterilization temperature Ts lies around 70° Celsius. For instance, when water is heated at Ts is 70° Celsius, the heating time t is preferably at least 30 seconds, while when heating water at 80° Celsius or 90° Celsius, the heating time t may be reduced to about 10 seconds. These values should not be construed as limiting, they are given for exemplary purposes only. It will be appreciated that in this way, water can be sterilized fast.

The temperature control means comprise a cooling system 10 for cooling down the sterilized water, a bypass 29, which in the illustrated embodiment is arranged to draw hot water directly from the heating system 11, and a valve, which in the illustrated embodiment is formed as a three-way valve 14, for mixing suitable amounts of cold water from the cooling system 10 and hot water from the heating system 11 so as to obtain water of the desired consumption temperature.

The cooling system 10 may for instance comprise a heat exchanger, preferably a counter flow heat exchanger, in which a cooling fluid is passed along the hot water to be cooled in a flow direction, which is substantially opposed to that of the hot water, or encloses an obtuse angle therewith. With such counter flow heat exchanger a relatively large amount of heat can be withdraw from the hot water, thereby enabling said water to be cooled down relatively fast. Consequently, cooling down time can be short.

Figure 2:
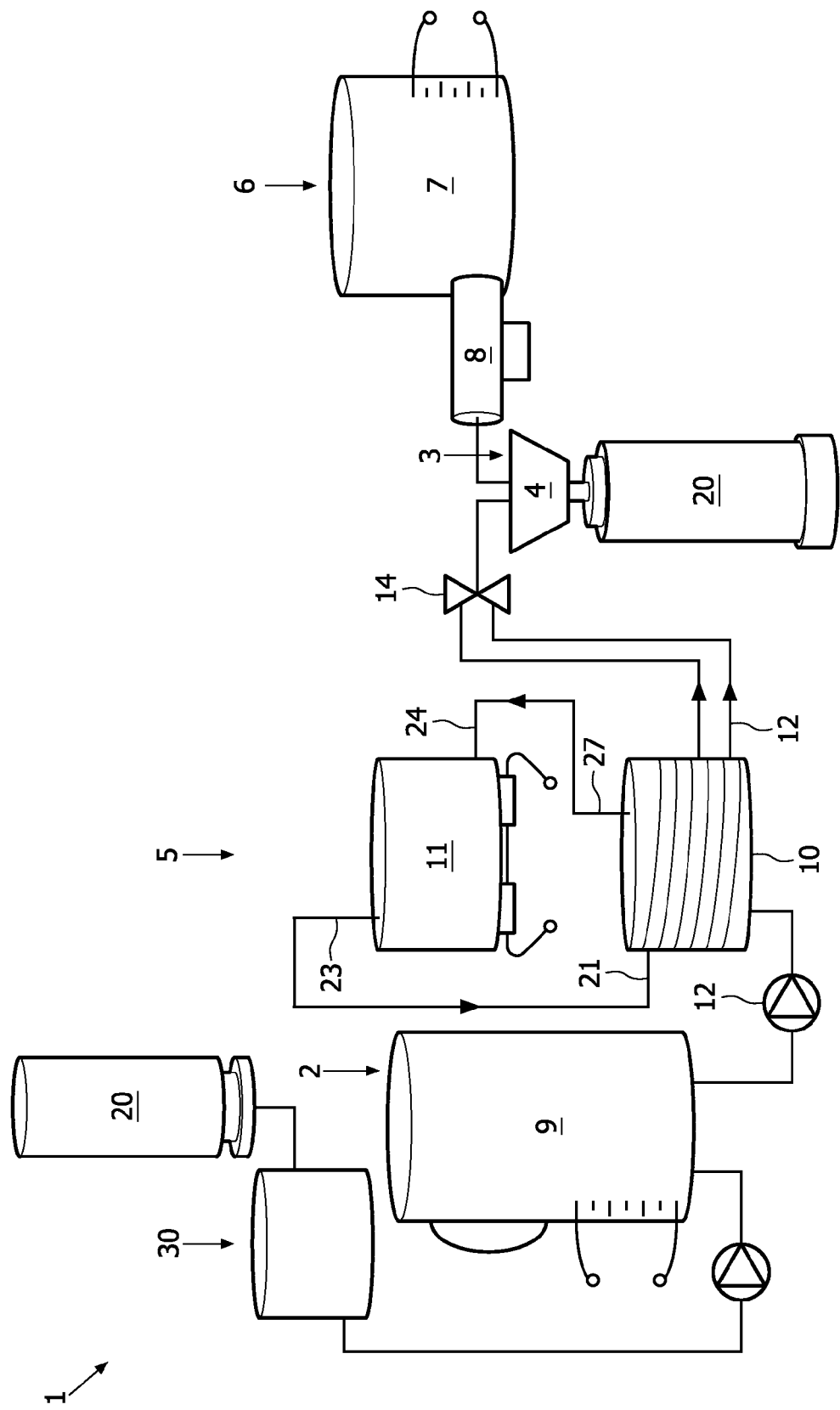
FIG. 2 shows a variation on the apparatus of FIG. 1.
Figure 3:
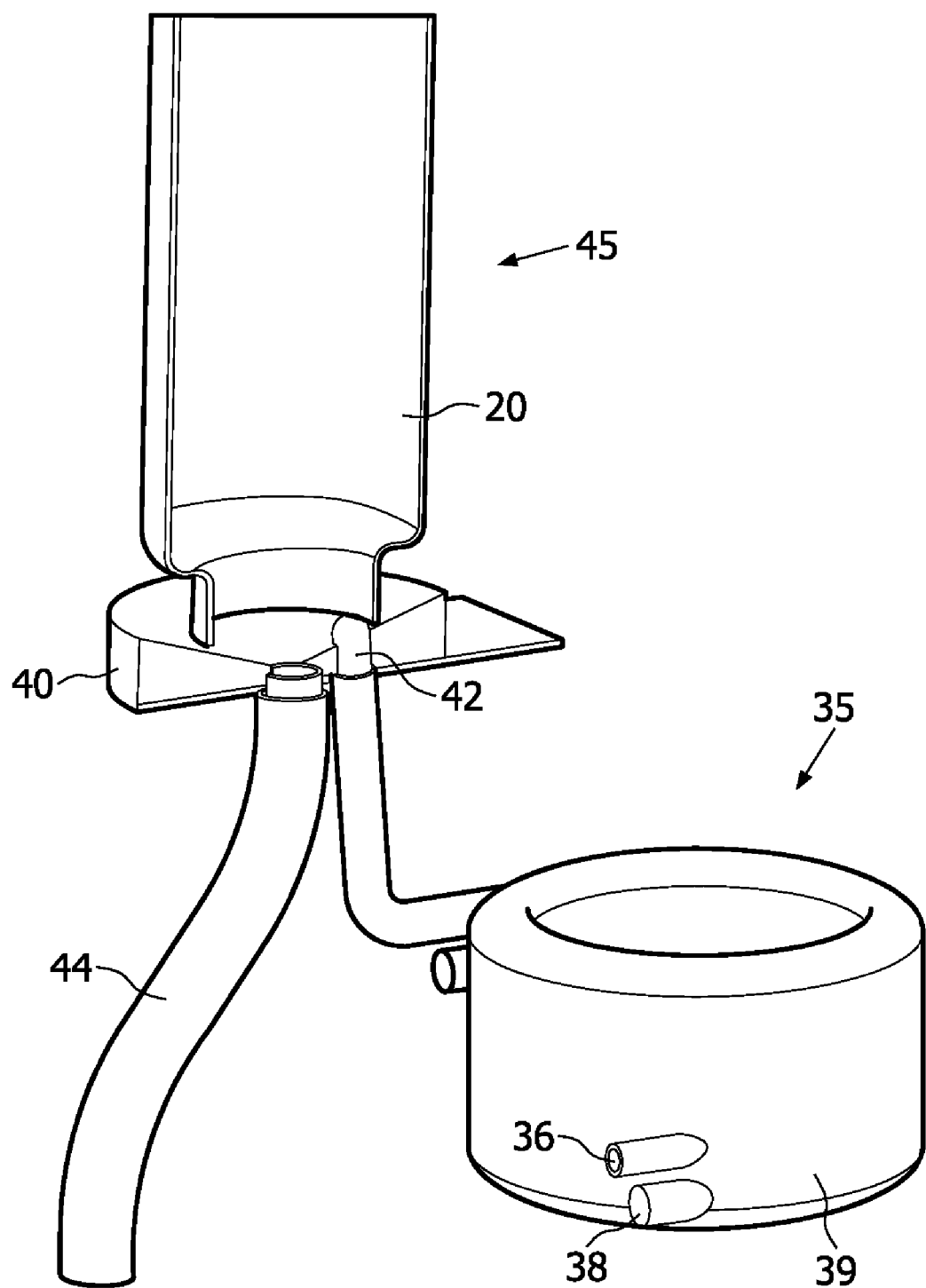
FIG. 3 shows a sterilization arrangement for a baby bottle, which can be connected to the setup of FIG. 1 or 2.

In a preferred embodiment the counter flow heat exchanger may for instance be configured as shown in FIGS. 2 and 3 of the non pre-published patent application of applicant, entitled "Apparatus for preparing a beverage from sterilized water and an instant product", the contents of which are incorporated herein by reference.

The cooling fluid used in such counter flow heat exchanger may be supplied by a separate supply loop, with a cooling fluid reservoir, pumping means, a supply line and a return line (all not shown). However, in a preferred embodiment, water from the supply system 2 is used as cooling fluid. After use, this water, which then will have a higher temperature, may be returned to the supply system 2, in particular the reservoir 9. However, this will cause the water temperature in the reservoir 9 to increase slowly, over time, thereby causing the cooling efficiency of the heat exchanger 10 to decrease gradually.

Therefore, in a most preferred embodiment, after use, the cooling water is fed into the heating system 11 via line 27-24, where it will be sterilized. Thanks to such arrangement, heat withdrawn in the cooling system 10 is not lost, but stored in the cooling water that is supplied to the heating system 11. Consequently, less energy will be needed to heat up this water to the sterilization temperature Ts. Furthermore, with this arrangement, the cooling system 10 is ensured of a continuous supply of fresh cooling-fluid, of a substantially constant temperature (i.e. the temperature $T_R$ in reservoir 9, which may be kept at ambient temperature or at some cooled temperature). Thanks to such constant supply, the cooling system 10 can maintain a substantially constant, large cooling capacity, which again may contribute to short cooling down times.

The water leaving the cooling system 10 may be of the desired consumption temperature, but most likely will be slightly lower. In the latter case, thanks to the bypass 29 and the valve 14, an appropriate amount of sterilized hot water can be added from the heating system 11 to accurately increase the water temperature to the desired value. The valve 14 may be provided for controlling a mixing temperature by controlling a flow rate of at least the cooled down water leaving the cooling system 10 and/or the warm water leaving the bypass 29. The valve 14 may be one or more simple valves which can be either completely opened or completely closed, in which case flow rate control may be performed by varying the duration during which and/or the frequency with which the valves are opened and closed. Alternatively, the or each valve may be of a type that allows a passage opening to be controlled, thereby allowing a flow rate through the valve to be controlled by adjusting said passage opening. In an embodiment, the valve may be arranged in the bypass or in a line leaving the cooling system or in both. In the latter case, a three-way valve may be used. To determine the necessary mixing ratio of cold and warm water, suitable temperature sensors may be provided (not shown) to measure the temperature of the cold and hot water. Such sensors may for instance be located closely upstream of the valve 14 or in the heating and cooling system 11, 10. A controller may be provided (not shown) for calculating the necessary cold and warm water volumes produced by the flow rates, based on the measured temperatures and the desired consumption temperature. To minimize the number of sensors (and associated costs) it is possible to measure the temperature of the water downstream of the valve 14 only, and adjust the valve settings, i.e. the warm water flow rate and cold water flow rate by means of a feedback control loop. Alternatively, it is possible to control the valve via a feed forward loop, which may be based on preset settings of the apparatus and/or information gained from for instance temperature sensors in the water reservoir and/or the heating system. An advantage of such feed forward loop is that it is fast and therefore allows water of the correct temperature to be delivered right from the start.

The controller may furthermore be programmed to let valve 14 pass through water from the bypass 29 only, for instance periodically or at predetermined instances, e.g. before and/or after every beverage preparing session. At the start of the session the hot sterile water may form a film that prevents instant product and/or beverage from sticking to the apparatus, whereas at the end of a mixing session, the water may wash away any remains of such instant product or beverage. Hence, the part of the apparatus that comes into contact with the beverage and/or instant product (i.e. the part downstream of valve 14) can be kept clean. In this way, sterilized water from the bypass may be run through parts of the apparatus, for example periodically or at predetermined instances, for rinsing said parts.

The controller may further contain or be programmable with user specific information, regarding for instance a feeding program, prescribed water/formula concentrations possibly depending on the formula brand, age and/or weight of a toddler, safety threshold values for triggering alarms when exceeded, etc.

Figure 4:
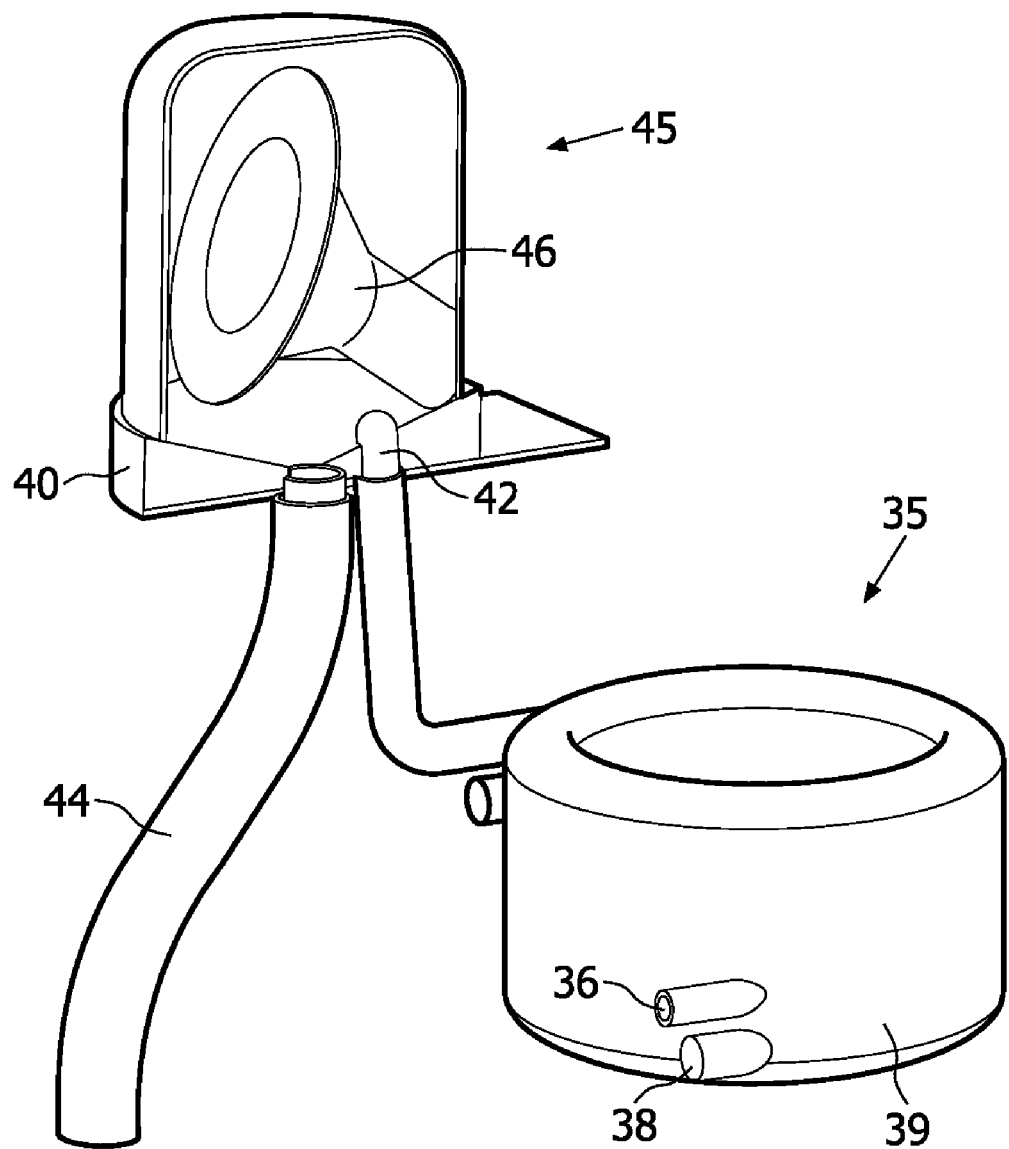
FIG. 4 shows the sterilization arrangement according to FIG. 3, adapted for sterilizing a teat or a component of the apparatus according to the invention.

The apparatus 1 according to FIG. 1 furthermore comprises a sterilizing device 30 for sterilizing bottles 20, teats 46 or other detachable parts of the apparatus 1. Conveniently, this device 30 may use sterilized water from the heating system 11 or cooling system 10. In a preferred embodiment, the device 30 may comprise a steam generator 32, arranged to produce superheated steam. The steam generator may be arranged to produce superheated steam from water supplied by one of the supply system, the cooling system, the heating system or the bypass. Such a steam generator may for instance comprise a thermoblock 35, as shown in FIGS. 3 and 4.

This thermoblock 35 may comprise a metal tube 36, for instance of stainless steel, and a tubular heating element 38, which together are embedded in a metal block 39, for instance of aluminum. Water is pumped into the tube 36 and heated to form super heated steam. The steam generator 32 may furthermore include an interface 40, designed to fixate and seal off a container 45. The container 45 may be a bottle 20 as illustrated in FIG. 3, or some other container as shown in FIG. 4, dimensioned to enclose a teat 46 or some other part to be sterilized.

The interface 40 furthermore comprises an inlet opening 42 for allowing steam generated in the thermoblock 35 to be injected into the container 45, and an outlet opening 44 for allowing condensed water to exit the container 45. It will be appreciated that with this steam generator 32 the inside of a bottle 20 can be quickly sterilized by placing the bottle 20 on the interface 40 and injecting a shot of steam. Likewise, the teat 46 of FIG. 4 can be sterilized, by injecting the container 45 with steam. It will furthermore be appreciated that the dimensions of the sterilization device 30 can be conveniently small, now that no separate container is needed to enclose the bottle 20. Consequently, the amount of water and hence the amount of energy needed to produce sufficient steam will be small as well. Thanks to the fact that the steam is superheated, sterilization may take place very quickly, i.e. within seconds. The sterilization device 30 can be integrated in the apparatus 1, but may also be conceived as a stand-alone appliance. In a preferred embodiment, the sterilization device 30 may be designed as an optional module, that can be detachablely coupled to the apparatus 1 via suitable coupling means such as the metal tube 36.

FIG. 2 shows an alternative embodiment of an apparatus 1 according to the invention, which differs from the one shown in FIG. 1, in that the bypass 29 branches off from the cooling system 10, somewhere between supply line 21, which supplies the cooling system with hot sterilized water from the heating system 10, and the outlet 22. Obviously, the water in the bypass 29 according to this embodiment will be less hot than the water in the bypass according to the embodiment of FIG. 1. This may for instance be advantageous in the case where the required consumption temperature may vary between a lower value, that more or less corresponds to the temperature of the cooled down water that leaves the cooling system, and a higher value that lies closer to the temperature of the water in the bypass. Of course, many other variations are possible.

The invention is not in any way limited to the exemplary embodiments shown in the description and the figures. All combinations (of parts) of the embodiments shown and described are explicitly understood to be incorporated within this description and to fall within the scope of the invention. Moreover, many variations are possible within the scope of the invention, as outlined by the claims.

The invention claimed is:

1. Apparatus for preparing a beverage, from an instant product and sterilized water, the apparatus comprising:
   a water supply system for supplying water;
   a heating system including a heating system inlet and a heating system outlet;
   a cooling system including first and second cooling system inlets and first and second cooling system outlets, the first cooling system inlet connected to the supply system for receiving the supplied water and the first cooling system outlet connected to the heating system inlet for supplying heating system water, the heating system configured to heat the heating system water to produce sterilized water from the heating system outlet, the second cooling system inlet further connected to the heating system outlet for cooling down the sterilized water;
   a valve connected at or downstream of the heating system outlet and upstream of the second cooling system outlet and connected to the second cooling system outlet, thereby allowing cooled down water leaving the cooling system to be mixed with the sterilized water from the heating system to produce warm water.

2. The apparatus according to claim 1, wherein the valve controls a mixing temperature by controlling a flow rate of at least the cooled down water leaving the second cooling system outlet and/or the warm water leaving the heating system outlet.

3. The apparatus according to claim 2, wherein the valve is a three-way valve.

4. The apparatus according to claim 1, wherein the cooling and heating system are arranged in such way that water from the supply system can successively be passed through the cooling system so as to serve as cooling fluid, through the heating system so as to be sterilized, and through the cooling system again, so as to be cooled down.

5. The apparatus according to claim 1, wherein the valve is configured to run sterilized water from the heating system outlet through parts of the apparatus downstream of the valve for rinsing said parts.

6. The apparatus according to claim 1, comprising a steam generator, arranged to produce superheated steam from water supplied by one of the supply system, the cooling system, the heating system or the bypass.

7. The apparatus according to claim 6, wherein the steam generator comprises a thermoblock.

8. The apparatus according to claim 6, wherein the steam generator comprises an interface for fixating and sealing off a container, which in use can be placed in or on said interface, the interface comprising an inlet opening, through which steam can be injected in the container and an outlet opening through which water that during use may condensate in said container, may leave the container.

9. The apparatus according to claim 8, wherein the steam generator is designed as a module, with a coupling for detachable coupling to the apparatus.

10. The apparatus according to claim 1, wherein the cooling system comprises a counter flow heat exchanger.

11. The apparatus according to claim 1, wherein the heating system is arranged to sterilize the water at temperatures above 70° C. and below 100° C., during a predetermined length of time, which depends on the sterilization temperature and generally is shorter as the sterilization temperature is higher.

* * * * *